United States Patent
Ballard (10) Patent No.: US 7,039,796 B2
(45) Date of Patent: May 2, 2006

(54) METHOD AND SYSTEM OF LOCATING A POSITION IN MEMORY AT WHICH TO STORE INCOMING FIRMWARE IMAGE

(75) Inventor: Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 10/161,984

(22) Filed: Jun. 4, 2002

(65) Prior Publication Data
US 2003/0226006 A1 Dec. 4, 2003

(51) Int. Cl.
*G06F 15/177* (2006.01)
(52) U.S. Cl. .......................................... 713/1; 713/100
(58) Field of Classification Search .................... 713/1, 713/2, 100; 717/168, 173
See application file for complete search history.

(56) References Cited

U.S. PATENT DOCUMENTS

| | | | |
|---|---|---|---|
| 5,230,052 A * | 7/1993 | Dayan et al. ................... | 713/2 |
| 5,579,522 A | 11/1996 | Christeson et al. | |
| 5,623,604 A * | 4/1997 | Russell et al. ............... | 717/167 |
| 5,930,504 A * | 7/1999 | Gabel ............................. | 713/2 |
| 5,960,445 A * | 9/1999 | Tamori et al. ............... | 707/203 |
| 6,032,255 A * | 2/2000 | Shim et al. ..................... | 713/2 |
| 6,122,732 A * | 9/2000 | Ahuja ............................ | 713/1 |
| 6,199,194 B1 * | 3/2001 | Wang et al. ................. | 717/118 |
| 6,237,091 B1 * | 5/2001 | Firooz et al. ................... | 713/1 |
| 6,275,412 B1 | 8/2001 | Kasa et al. | |
| 6,385,672 B1 * | 5/2002 | Wang et al. .................... | 710/56 |
| 6,434,696 B1 * | 8/2002 | Kang ............................. | 713/2 |
| 6,438,688 B1 * | 8/2002 | Nunn ............................. | 713/2 |
| 6,567,911 B1 * | 5/2003 | Mahmoud ....................... | 713/2 |
| 6,615,286 B1 * | 9/2003 | Chobotaro et al. ............ | 710/8 |
| 6,668,374 B1 * | 12/2003 | Sten et al. ................... | 717/173 |

(Continued)

FOREIGN PATENT DOCUMENTS

EP 0601704 B1 6/1994

(Continued)

*Primary Examiner*—Chun Cao (57) ABSTRACT

A method of locating a starting point of a firmware image in a non-volatile memory unit may include checking each of a number of possible starting points within the non-volatile memory unit until a code space signature is located that indicates the starting point of the firmware image. A system for implementing this method in a host device may include a non-volatile memory unit of the host device, and a boot module stored in the host device for execution by a processor, where the boot module is configured, when executed, to check each of a number of possible starting points for the firmware image within the non-volatile memory unit until a code space signature is located that indicates the starting point of the firmware image. A method of locating where in a non-volatile memory unit an incoming firmware image can be stored may include, on receipt of a the incoming firmware image, attempting to erase at least one block of the non-volatile memory unit and storing the incoming firmware image in the non-volatile memory unit where the attempt to erase succeeds. A system for implementing this method in a host device may include a processor of the host device for running an existing firmware image and a non-volatile memory unit of the host device, where the existing firmware image is configured, on receipt of a the incoming firmware image, to attempt erasure of at least one block of the non-volatile memory unit, and store the incoming firmware image in the non-volatile memory unit where the attempted erasure succeeds.

12 Claims, 6 Drawing Sheets

U.S. PATENT DOCUMENTS

| | | | |
|---|---|---|---|
| 6,813,571 B1 * | 11/2004 | Lightbody et al. | 702/62 |
| 6,865,669 B1 * | 3/2005 | Mahmoud | 713/1 |
| 6,928,548 B1 * | 8/2005 | Hale et al. | 713/187 |
| 2002/0073307 A1 * | 6/2002 | Bautz et al. | 713/2 |
| 2003/0154471 A1 * | 8/2003 | Teachman et al. | 717/171 |
| 2003/0191955 A1 * | 10/2003 | Wagner et al. | 713/191 |

FOREIGN PATENT DOCUMENTS

| | | |
|---|---|---|
| EP | 1087294 | 3/2001 |
| WO | WO 02/27444 A2 | 4/2002 |

* cited by examiner

METHOD AND SYSTEM OF LOCATING A POSITION IN MEMORY AT WHICH TO STORE INCOMING FIRMWARE IMAGE

FIELD OF THE INVENTION

The present invention relates to the field of firmware. More particularly, the present invention relates to a method and system of locating a firmware image in non-volatile memory.

BACKGROUND OF THE INVENTION

Firmware is the computer code or software that is stored in an electronic device to control the operation of that device. Many electronic devices operate using a piece of firmware, e.g., include wireless phones, set-top boxes, digital music players, etc. The device on which the firmware is stored and executed is frequently referred to as the host or the host device.

The firmware is typically stored in a non-volatile memory unit of the host device, for example, a flash memory unit. A non-volatile memory unit retains data even when power to the memory unit is discontinued. Consequently, the firmware is maintained while the host device is deactivated and is available when the host is activated.

When the host device is started, the firmware is typically loaded into volatile memory, e.g., Random Access Memory (RAM), and executed by the processor of the host device. The processor's execution of the firmware causes the device to operate and provide the function or functions for which the host device was intended. In addition to providing the device's functionality, the firmware may also include a user interface allowing the user to control the functioning of the host device.

Host devices also typically store a boot module or boot algorithm in non-volatile memory. This boot module is essential for starting the host device. When the host device is started, the boot module provides the processor with the initial instructions that operate the host device until the host's firmware is loaded and executed and takes over control of the host device.

A key function of the boot module is to locate the firmware in non-volatile memory. The firmware is then retrieved or read out of the non-volatile memory for execution by the processor. Thus, the boot module must have some means of locating the firmware image in the non-volatile memory unit.

In the past, this locating function has entailed configuring the boot module to expect a particular architecture in the non-volatile memory unit. However, if the non-volatile memory unit is ever replaced with a unit having a different architecture, the conventional boot module has no way of locating the firmware image to use at startup.

Firmware is initially loaded in the host device before the device is placed in service. Thereafter, it frequently becomes necessary or desirable to change or upgrade the firmware in a host device. For example, a new firmware version may operate more robustly than an earlier version. A new firmware version may also provide additional features or extend the functionality of the host device.

When firmware is downloaded into the host device, either initially or as part of an upgrade, it must be stored at some location in the non-volatile memory. It is important that the location selected for the incoming firmware be available and adequate. In particular, it is essential that the incoming firmware not be written over the boot module, which is also stored in the non-volatile memory unit.

SUMMARY OF THE INVENTION

In one embodiment, the present invention may be a method of locating a starting point of a firmware image in a non-volatile memory unit, the method comprising checking each of a number of possible starting points within the non-volatile memory unit until a code space signature is located that indicates the starting point of the firmware image.

In another embodiment, the present invention may be a system for locating a starting point of a firmware image in a non-volatile memory unit of a host device comprising the non-volatile memory unit of the host device, and a boot module stored in the host device for execution by a processor, where the boot module is configured, when executed, to check each of a number of possible starting points for the firmware image within the non-volatile memory unit until a code space signature is located that indicates the starting point of the firmware image.

In another embodiment, the present invention may be a method of locating where in a non-volatile memory unit an incoming firmware image can be stored, the method comprising, on receipt of a the incoming firmware image, attempting to erase at least one block of the non-volatile memory unit and storing the incoming firmware image in the non-volatile memory unit where the attempted erasure succeeds.

In another embodiment, the present invention may be a system for locating where in a non-volatile memory unit of a host device an incoming firmware image can be stored, the system comprising a processor of the host device for running an existing firmware image, a channel for receiving the incoming firmware image in the host device, and a non-volatile memory unit of the host device, where the existing firmware image is configured, on receipt of the incoming firmware image, to attempt erasure of at least one block of the non-volatile memory unit, and store the incoming firmware image in the non-volatile memory unit where the attempted erasure succeeds.

BRIEF DESCRIPTION OF THE DRAWINGS

The accompanying drawings illustrate embodiments of the present invention and are a part of the specification. Together with the following description, the drawings demonstrate and explain the principles of the present invention. The illustrated embodiment are examples of the present invention and do not limit the scope of the invention.

Throughout the drawings, identical reference numbers designate similar, though not necessarily identical, elements.

DETAILED DESCRIPTION

The present invention provides a method of locating the starting point of the firmware image within a memory unit. The present invention further provides a method of identifying what block in the memory unit contains the boot code that should be avoided when downloading and storing a firmware image. Some of the techniques of the present invention involve ways of providing or acquiring information about the memory unit to the software handling the firmware download. For example, a running firmware image will generally query the flash memory chip to determine memory sector sizes and the erase algorithms specific to that memory chip. There are many different erase algorithms used in flash memory chips. By way of comparison, the boot code only has to read the flash memory unit, which reading process always works in the same way. On the other hand, the software managing firmware download must handle both erasing and writing data within the memory unit.

Figure 1:
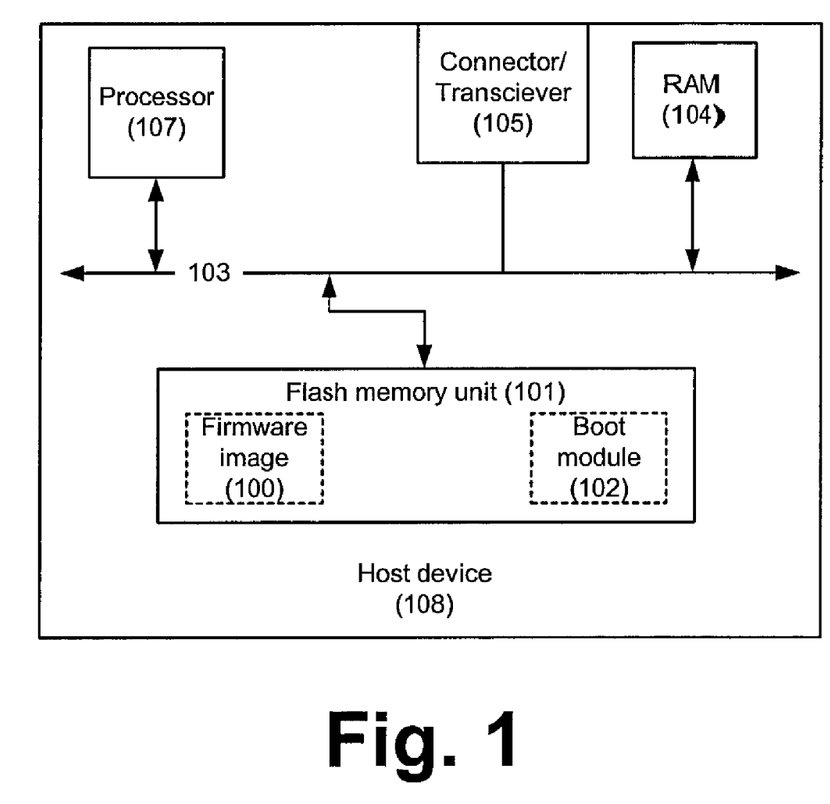
FIG. 1 is a block diagram of an exemplary embodiment of a host device with firmware and boot module images in a flash memory device according to the principles of the present invention.

FIG. 1 is a block diagram of an exemplary host device that stores and executes a piece of firmware to provide a desired functionality. As shown in FIG. 1, the host device (108) includes a non-volatile memory unit (101), e.g., a flash memory unit. This non-volatile memory unit (101) may be a single non-volatile memory device or may be a plurality of non-volatile memory devices. The non-volatile memory unit (101) contains one or more firmware images (100) and a boot module (102).

The host device (108) also has a processor (107) and, preferably, Random Access Memory (RAM) (104). The processor (107) typically loads the firmware (100) into the RAM (104) and then executes the firmware (100). A data bus (103) interconnects the processor (107), RAM (104) and flash memory unit (101) so that data can be transmitted among the various components of the host device (108).

A connector or transceiver (105) is a channel through which data, such as a firmware image, can be downloaded into the host device (108). The connector/transceiver (105) also connects to the bus (103) and can, therefore, provide data to the various components of the host device (108) that are connected to the bus (103).

If the connector/transceiver (105) is a connector, it can be used to connect the host device (108) to a network or another device such as a computer that can provide data to the host device (108). For example, the connector (105) can be a connection to the Internet, a Local Area Network (LAN) or a Wide Area Network (WAN). Alternatively, the connector can be used to connect the host device (108) to a computer, server, disc drive or other device that provides data, such as a firmware image, to the host device (108). The connector (105) may be, for example, a serial connection, a Universal Serial Bus (USB) connection, an Institute of Electrical and Electronics Engineers (IEEE) 1394 connection, etc.

If the connector/transceiver (105) is a transceiver, the transceiver (105) can be used, for example, to wirelessly receive data in the host device (108*a*). The transceiver (105) may be an optical, infrared, radio frequency or other type of transceiver. Any means of downloading data, i.e., a firmware image, into the host device (108*a*) can be used within the principles of the present invention.

When the host device (108) is initially powered up, the processor (107) will automatically load the boot code module (102) from flash memory (101) into the RAM (104). From RAM (104), the processor (107) can execute the boot code (102). The boot code (102) provides the initial instructions that allow the host device (108) to begin operating, including loading and executing the firmware. Thus, it is the boot code (102) that oversees the loading of the firmware from flash memory (101) into RAM (104).

The boot code (102) locates the firmware image (100) in non-volatile memory (101). The firmware (100) will have a starting point somewhere in the non-volatile memory unit (101). Once this starting point is located, the firmware (100) can be read out of the non-volatile memory (101) and into RAM (104) for execution. However, simply locating the firmware image (100) in memory (101) can be difficult.

flash memory devices that are frequently used in host devices to store downloaded firmware for that host can have different memory organization formats depending on both the manufacturer of the memory and the type of memory, flash memory chips are also frequently rendered obsolete and replaced with new versions that may not have the same memory layout as the previous version. Consequently, as noted earlier, the boot code may not necessarily know where a firmware image starts within the currently installed flash memory unit.

Figure 2:
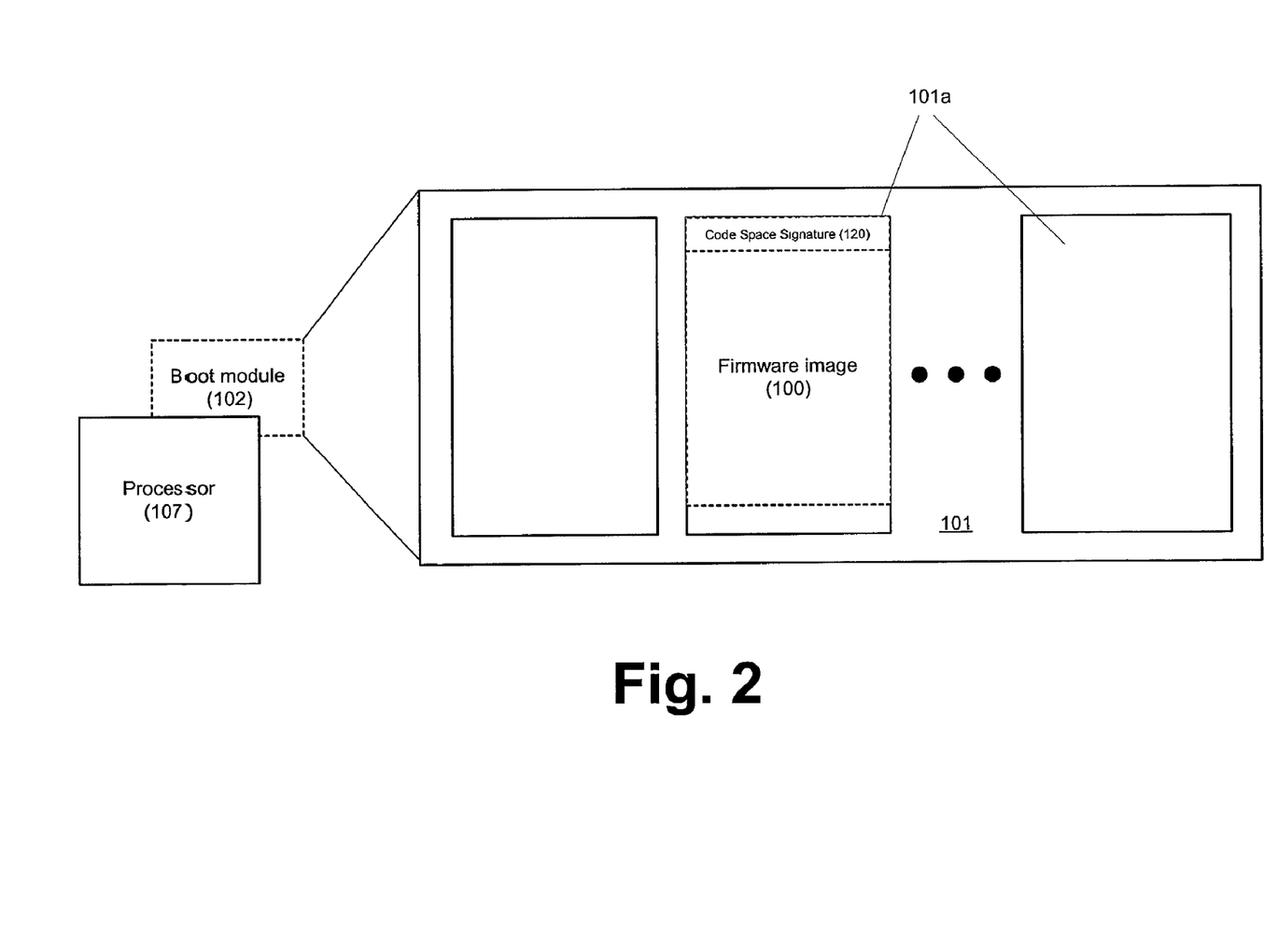
FIG. 2 is a block diagram that illustrates an embodiment of a system according to principles of the present invention for locating the starting point of a firmware image in non-volatile memory.

As shown in FIG. 2, flash memory units (101) are commonly divided into memory blocks (101*a*). Each such block (101*a*) must be erased as a block, i.e., it is not possible to erase only part of a memory block. A firmware image (100) will typically begin at the beginning of a block (101*a*). Consequently, there are a limited number of locations, i.e., the beginning of each block (101*a*), within the memory unit (101) where a firmware image (100) could start. For example, the size of flash memory block is typically a factor of 2 and usually at least 4096 bytes, so firmware images will typically begin at a 4096 byte boundary. The possible starting locations can be further reduced by definition, such as by requiring that the download process only load code on 128K byte boundaries for memory units larger than 1 Megabyte.

Under principles of the present invention, a code space signature (120) is defined that is unlikely to randomly occur anywhere else in the memory (101). This code space signature (120) is placed at the beginning of a firmware image (100) as shown in FIG. 2.

As will be appreciated by those skilled in the art, there is almost an infinite number of ways the code space signature can be defined. Any code space signature (120) that is unlikely to randomly occur in the memory unit (101) and identifies the beginning of a firmware image (100) is within the scope of the present invention. By way of example, the text string "CODE START" can be used as the code space signature (120) followed by a checksum over that string.

As noted above, the boot module (102) is run by the processor (107) when the host device is initially powered up. As will be described in detail below, the boot module (102) according to the present invention, searches possible starting points within the memory unit (101) for a code space signature (120) that indicates the beginning of a firmware image (100) within the memory unit (101). When the code space signature (120) is located, the firmware (100) can be read out of the non-volatile memory unit (101) for execution. In this way, the boot module (102) is not dependent on a particular non-volatile memory architecture. Rather, the non-volatile memory unit (101) can be replaced or upgraded as needed without causing problems resulting from the boot module (102) being unable to locate the firmware image (100) when the host device is powered up.

Figure 3:
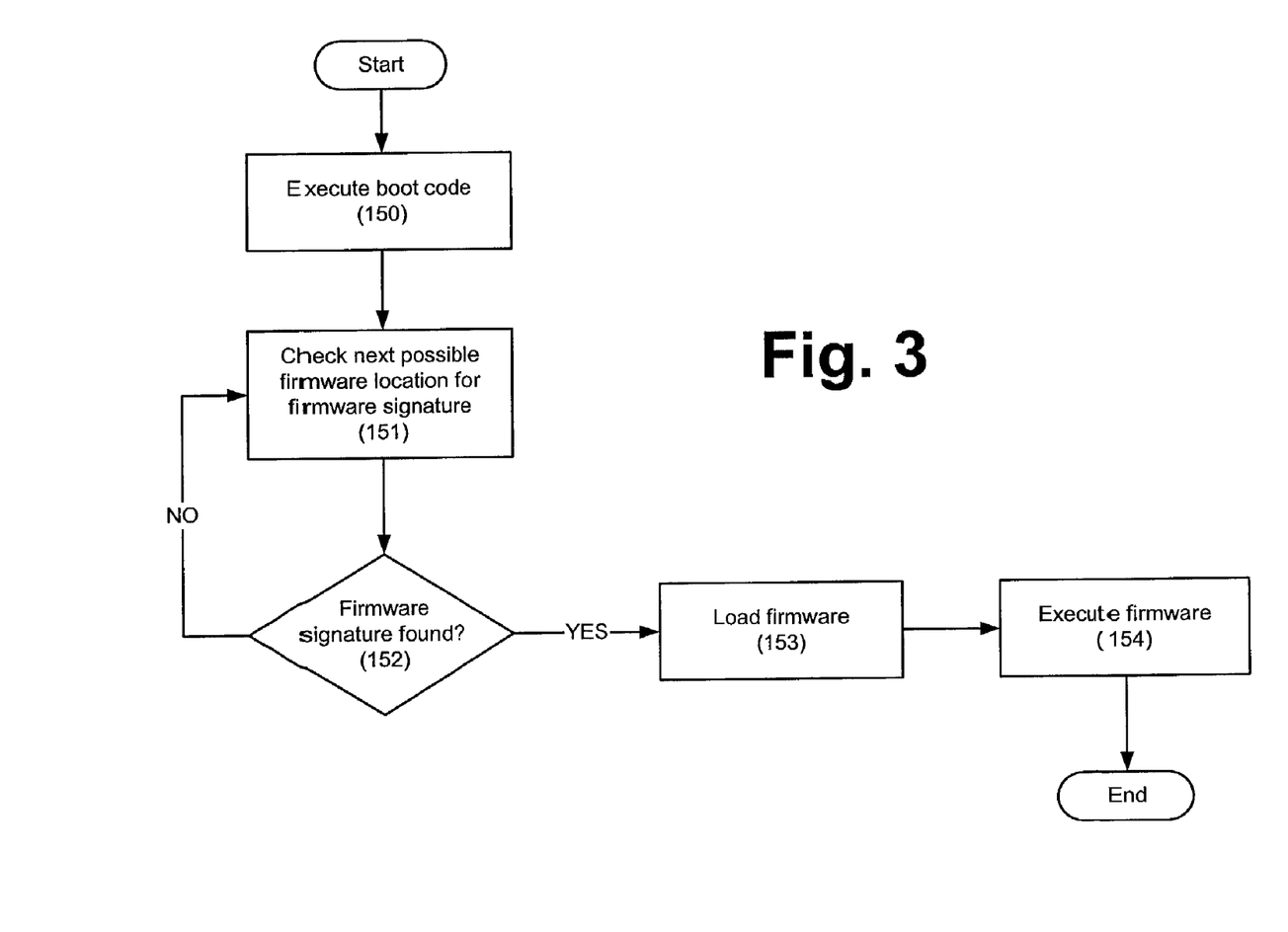
FIG. 3 is a flowchart that illustrates an embodiment of a method according to principles of the present invention for locating the starting point of a firmware image that is stored in non-volatile memory.

A method of locating the starting point of a firmware image in non-volatile memory according to principles of the present invention is illustrated, for example, in FIG. 3. As shown in FIG. 3, the boot code is first loaded and executed. (step 150). The boot code searches all of the possible code starting points, e.g., the beginning of the memory blocks, for the code space signature until the code space signature is located, (step 151). Thus, for example, the boot code will check every 4K (4096 bytes) in the first 32K of the flash memory unit, then every 32K to 128K, then every 128K to 4,000K, then in multiples of 512K. When the code space signature is located (decision 152), the starting point for a corresponding firmware image is also located. The firmware can then be loaded (step 153) and executed (step 154).

The time spent searching for the start of the firmware image is insignificant during the startup procedure of most host devices. By using this scheme to locate the firmware image, use of the boot module is not impacted by a change in non-volatile memory to a new non-volatile memory device having a different architecture. Thus, it becomes easier to upgrade the non-volatile memory in the host device.

Figure 4:
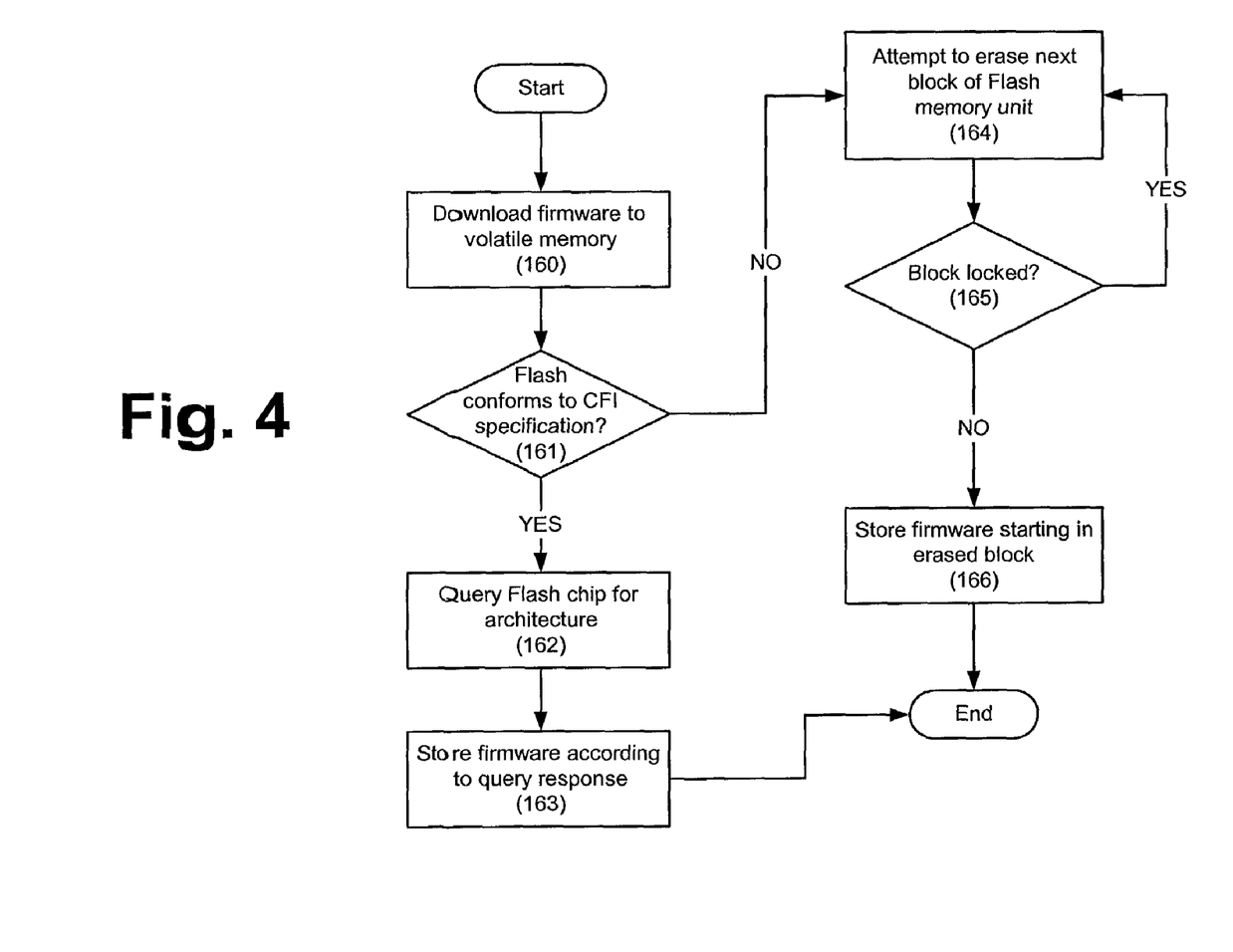
FIG. 4 is a flowchart that illustrates an embodiment of a method according to principles of the present invention for identifying a location in memory at which an incoming firmware image can be stored.

FIG. 4 is a flowchart illustrating a method according to principles of the present invention for identifying a location in non-volatile memory to store an incoming firmware image that is being downloaded to the host device. When storing a firmware image, a key consideration is to not overwrite the boot code module, which is also stored in non-volatile memory. If the boot code module is overwritten, the host device will be rendered inoperable.

Some flash memory units are able to lock the region where the boot code module is stored. In other words, the memory block(s) where the boot code module is stored cannot be erased. Other flash memory chips conform to the Common flash Interface (CFI) specification. This specification dictates a method for querying the chip for its type and other basic information. Consequently, the chip can report its architecture, including a location for the boot code, in response to an appropriate query. For chips that do not respond to CFI commands, the firmware may try all known flash chip inquiry commands to figure out what type of chip is loaded and obtain basic information about that chip. In flash memory chips that do not support inquiries or locking of the boot code module, the boot code may be defined to be in the first 8K of the memory space.

As shown in FIG. 4, an incoming firmware image may be temporarily written to volatile memory prior to long-term storage in the non-volatile (e.g., flash) memory. (step 160). If the non-volatile memory is a flash memory unit that conforms to the CFI specification (decision 161), a query can be sent to the flash memory unit by the executing firmware that is controlling the receipt of the new incoming firmware image (step 162). The flash memory unit will respond, according to the CFI specification, with information about the flash memory unit's architecture which will define where the boot code image is located and potential starting points for firmware images.

The incoming firmware can then be written into the flash memory from volatile memory in accordance with this response (step 163). In other words, the incoming firmware can be written to the flash memory unit at a location that does not conflict with the boot code module.

If the intent is to overwrite a previous firmware image, the algorithm described above can be used to identify where the incoming firmware image should be stored. In other words, the search for a code space signature can be conducted to identify where in the non-volatile memory the existing firmware image begins. This location is then used as the starting point for saving the new incoming firmware image. The incoming firmware image then overwrites the previous firmware image. This method can easily be extended to overwrite a particular firmware image in flash units that contain multiple firmware images.

If the non-volatile memory unit is a flash memory unit that does not conform to the CFI specification, it may have a locked region for the boot code, i.e., a region containing the boot code that cannot be erased.

Consequently, the firmware controlling the download may attempt sequentially to erase blocks of memory where incoming the firmware image could be stored. (step 164). If the block is locked, the erasure will fail. (decision 165). If the erasure succeeds, the block erased was not the locked block containing the boot code. (decision 165). The incoming firmware image can then be written into the erased block. (step 166). Because some flash units do not support locking, it is preferred to attempt erasure after the first 8K so that devices that store the boot code within the first 8K of memory are not damaged.

Figure 5:
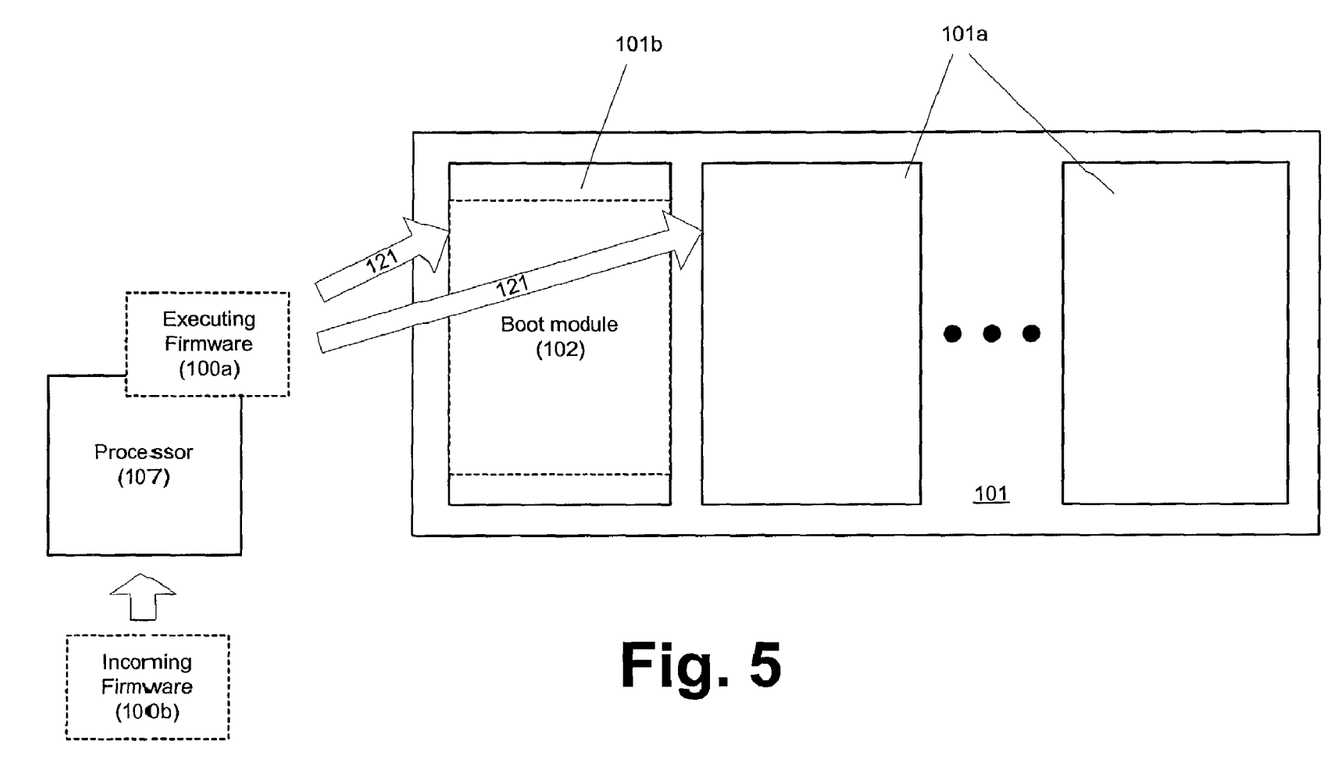
FIG. 5 is a block diagram illustrating an embodiment of a system according to principles of the present invention for identifying a location in memory at which an incoming firmware image can be stored.

FIG. 5 illustrates a system for use in a host device that identifies a location in memory at which an incoming firmware image can be stored using the method illustrated in FIG. 4. As shown in FIG. 5, a host device is typically operating when a new, incoming firmware image (100b) is received. Consequently, an existing firmware image (100a) is then being executed by the processor (107) of the host device.

Under principles of the present invention, the existing firmware image (100a) is configured to manage the downloading and storage of the incoming firmware image (100b). Consequently, the executing firmware (100a) must determine where in the non-volatile memory unit (101) the incoming firmware (100b) can be stored without compromising the boot module (102).

One embodiment of a system of the present invention operates on the assumption that the memory block(s) (101b) that contain the boot module (102) will be locked, meaning that the executing firmware (100a) will not be able to erase that locked block (101b). Consequently, upon receipt of an incoming firmware image (100b), the executing firmware (100a) will send erasure commands (121) to the blocks (101a) of the non-volatile memory unit (101). In doing so, the executing firmware (100a) may erase its own image from non-volatile memory (101).

If the block is locked (e.g., 101b), the erasure command will fail. This indicates that that block (101b) contains some or all of the boot module (102). If the erasure command succeeds, the block (e.g., 101a) is erased and did not contain the boot module (102). The executing firmware (100a) can then safely direct storage of the incoming firmware image (100b) in a block or blocks where the erasure command (121) succeeded. In this way, the incoming firmware (100b) is appropriately stored in non-volatile memory (101).

After the incoming firmware image (100b) has been stored in the non-volatile memory (101), it may be the only firmware image resident in the non-volatile memory (101). In other words, the image of the executing firmware (100a) may have been erased by the erasure commands (121) issued to the various memory blocks in the non-volatile memory unit (101).

When the host device is restarted, the boot module (102) will load and run. The boot module (102) will then seek to load and execute a firmware image from non-volatile memory. The boot module (102) may use the method described above to find the starting point of the newly-stored incoming firmware (100b) in non-volatile memory. The incoming firmware (100b) is then loaded and executed and becomes the executing firmware of the host device.

An alternative to the "attempt to erase" method described above is to require that all firmware images contain a header that provides information on flash memory space requirements and a field for current storage location. The boot code will select the firmware image and copy it into memory. The boot code also fills in the header field for current storage location so that the running firmware knows where its copy resides in flash memory. Specifically, the header will preferably have a field indicating where the image is stored, e.g., "My Location," and a field indicating where the image ends, e.g., "My End."

Figure 6:
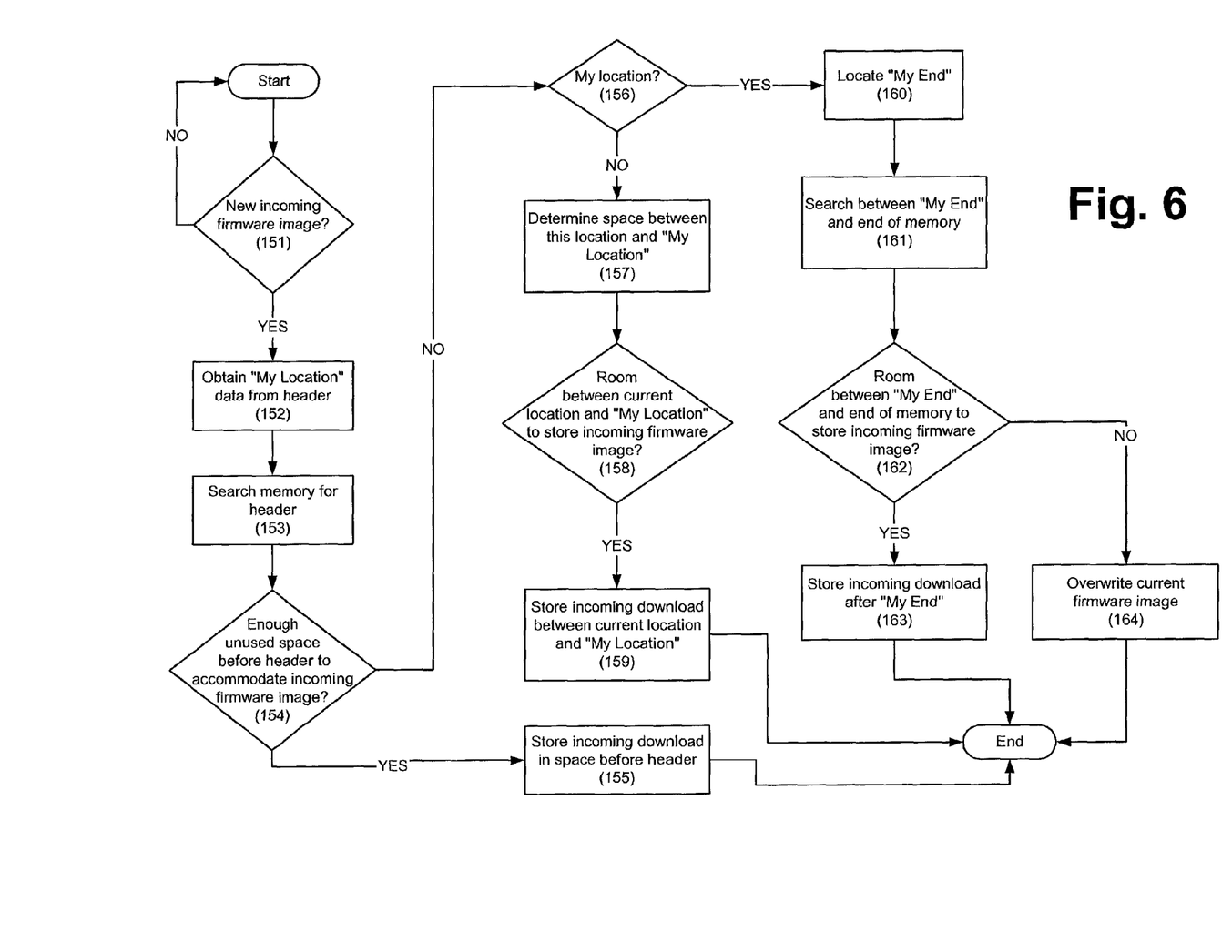
FIG. 6 is a flowchart illustrating another embodiment of a method of locating a place in memory to store an incoming according to principles of the present invention.

FIG. 6 illustrates this embodiment of a method of the present invention. As shown in FIG. 6, the method begins when a new firmware image is ready for download (151). As indicated above, the running firmware image responsible for handling the download has My Location and My End information for its own image in memory (152).

The running firmware then searches memory for a header (153). The search is preferably sector-by-sector looking for a firmware header, starting with the first sector after 8K bytes. It is presumed that the boot code may be stored in the first 8K bytes and that the first sector after 8K will be available for firmware storage.

When a header is found, the running firmware will determined if there is enough unused space before the header to accommodate the incoming firmware image (154). If so, the incoming firmware image download can be stored before the header (155). If there is not enough free space before the header, the running firmware determines if it is reading the location of its own image as indicated by "My Location." (156).

If this is not the location of the running firmware's own image, the running firmware will determine (157) if there is enough unused space between this location and "My Location" to accommodate the incoming firmware image (158). If so, the incoming firmware image can be stored between this location and "My Location." (159).

Next, the running firmware may locate the end of its own image, e.g., "My End." (160). A search is then made between "My End" and then end of memory to determine if there is sufficient space to accommodate the incoming firmware image (162). If so, the incoming firmware image can be stored following "My End." (163). Otherwise, the running firmware may have to overwrite its own image in memory (164) to accommodate the incoming firmware image.

The present invention, in its many possible embodiments, is important because boot code can be written once to support the use of almost any type of flash chip and the main firmware can be written to understand several different types of chips. If the type of memory device, e.g. a FLASH device, ever has to be changed because of, for example, a cost reduction or because the previous chip became obsolete, the present invention enables the boot code and the running firmware to adjust to the new chip and appropriately store new incoming firmware.

What is claimed is:

1. A method of locating a position in memory at which to store an incoming firmware image, said method comprising storing a firmware image in memory with a header that comprises information about a location within memory of said firmware image, said method further comprising:
   searching memory for a header associated with a firmware image;
   locating said header;
   determining if there is enough space in memory associated with said header to accommodate said incoming firmware image; and
   if so, storing said incoming firmware image in said space in the memory associated with said header.

2. The method of claim 1, further comprising:
   obtaining information about a location of a current firmware image in memory;
   determining if there is sufficient space between a location of said located header and said location of a current firmware image to accommodate said incoming firmware image; and
   if so, storing said incoming firmware image between said location of said located header and said location of a current firmware image.

3. The method of claim 2, further comprising:
   determining if there is sufficient space after said current firmware image to accommodate said incoming firmware image; and
   if so, storing said incoming firmware image after said current firmware image.

4. The method of claim 1, further comprising overwriting a current firmware image to accommodate said incoming firmware image.

5. The method of claim 1, wherein said searching comprises skipping a first portion of each block of memory searched for said header.

6. The method of claim 5, wherein said first portion is a first 8K bytes of each memory block.

7. Computer-readable instructions for locating where in a non-volatile memory unit an incoming firmware image can be stored, said instructions, when executed, causing a processor to store a firmware image in memory with a header that comprises information about a location within memory of said firmware image,
   said instructions further causing said processor to:
   search memory for a header associated with a firmware image;
   locate said header;
   determine if there is enough space in memory associated with said header to accommodate said incoming firmware image; and
   if so, store said incoming firmware image associated with said header.

8. The computer-readable instructions of claim 7, said instructions further causing said processor to:
   obtain information about a location of a current firmware image in memory;
   determine if there is sufficient space between a location of said located header and said location of a current firmware image to accommodate said incoming firmware image; and
   if so, store said incoming firmware image between said location of said located header and said location of a current firmware image.

9. The computer-readable instructions of claim 7, said instructions further causing said processor to:
   determine if there is sufficient space after said current firmware image to accommodate said incoming firmware image; and
   if so, store said incoming firmware image after said current firmware image.

10. The computer-readable instructions of claim 7, wherein said search of the memory comprises skipping a first portion of each block of memory searched for said header.

11. A method of locating a position in memory at which to store an firmware image, said method comprising storing a firmware image in memory with a header that comprises information about a location within memory of said firmware image, said method further comprising:
- locating said header in memory;
- determining whether said header is associated with a current firmware image;
- if not, determining if there is enough space between said header and a start of said current firmware image in memory to accommodate an incoming firmware image; and
- if so, storing said incoming firmware image in space after said header.

12. Computer-readable instructions for locating where in a non-volatile memory unit an incoming firmware image can be stored, said instructions, when executed, causing a processor to store a firmware image in memory with a header that comprises information about a location within memory of said firmware image, said instructions Thither causing said processor to:
- locate said header in memory;
- determine whether said header is associated with a current firmware image;
- if not, determine if there is enough space between said header and a start of said current firmware image in memory to accommodate an incoming firmware image; and
- if so, store said incoming firmware image in space after said header.

* * * * *

UNITED STATES PATENT AND TRADEMARK OFFICE
CERTIFICATE OF CORRECTION

PATENT NO. : 7,039,796 B2  Page 1 of 1
APPLICATION NO. : 10/161984
DATED : May 2, 2006
INVENTOR(S) : Curtis C. Ballard It is certified that error appears in the above-identified patent and that said Letters Patent is hereby corrected as shown below:

On the title page, in item (54), in "Title", in column 1, line 3, after "STORE" insert -- AN --.

In column 1, line 3, after "STORE" insert -- AN --.

In column 9, line 6, in Claim 11, insert -- incoming -- before "firmware".

In column 10, line 6, in Claim 12, delete "Thither" and insert -- further --, therefor.

Signed and Sealed this

Sixth Day of October, 2009

David J. Kappos
*Director of the United States Patent and Trademark Office*